United States Patent

[19]

Kao

[11] Patent Number: 5,962,037

[45] Date of Patent: Oct. 5, 1999

[54] DEVICE FOR MANUFACTURING BRAKE PADS

[76] Inventor: Chun-Ching Kao, No. 65, Sec. 2, Chang Nan Road, Chang, Hwa City, Taiwan

[21] Appl. No.: 09/190,110

[22] Filed: Nov. 12, 1998

[51] Int. Cl.[6] .............................. B29C 33/42; B29C 45/26
[52] U.S. Cl. ...................... 425/190; 425/195; 425/451.9; 425/470
[58] Field of Search .................. 425/DIG. 44, DIG. 239, 425/195, 233, 451.9, 403, 470, 190

[56] References Cited

U.S. PATENT DOCUMENTS

| | | | |
|---|---|---|---|
| 4,492,607 | 1/1985 | Halcomb | 425/DIG. 44 |
| 5,344,296 | 9/1994 | Laninga | 425/DIG. 44 |
| 5,824,249 | 10/1998 | Leitch et al. | 425/195 |

*Primary Examiner*—Harold Pyon
*Assistant Examiner*—Mark A. Wentink
*Attorney, Agent, or Firm*—Rosenberg, Klein & Bilker

[57] ABSTRACT

A device for manufacturing brake pads includes a base board with three flanges extending from the upper side thereof and each of the flanges has a plurality of notches defined in the sides thereof, a first mold and a second mold respectively received in the first recess defined between the first and the second flange, and the second recess defined between the second and the third flange, and cover mold mounted to the first and the second mold. The first mold has a plurality of slots and the second mold has a plurality of concavities, which are respectively located in alignment with the slots. The cover mold has a plurality of elongated recesses which communicate with the aligned slots, the concavities and the notches so that the brake pads are formed between the base board, the two molds and the cover mold.

2 Claims, 5 Drawing Sheets

DEVICE FOR MANUFACTURING BRAKE PADS

FIELD OF THE INVENTION

The present invention relates to a device for manufacturing brake pads, and more particularly, to a mold set comprising a base board with a first mold and a second mold movably positioned on the base board and a cover mold mounted to the first mold and the second mold so that the raw edge formed between the molds is formed on the lateral side of the pad.

BACKGROUND OF THE INVENTION

FIG. 1 shows a first conventional brake pad device used for bicycle brake system and includes a metallic frame 10 with a threaded rod 101 extending from the first side thereof and a rubber made pad 11 which is fixedly connected to the second side of the metallic frame 10 so that the wheel is stopped when the brake surface 110 contacts against the wheel rim. However, such brake pad device is difficult to be replaced because the threaded rod 101 is fixedly connected to the caliper of the brake system of the bicycle. FIG. 3 shows an improved brake pad device wherein the rubber pad 300 has two side flanges 31 extending from the brake pad 300 and the metallic frame 20 has a transverse slot 21 defined in the top thereof with two grooves 22 defined in two sides of the metallic frame 20 so as to receive the two side flanges 31 of the brake pad 30. A pin 32 extends through the side walls of the metallic frame 20 and the brake pad 300 to further secure the brake pad 300 in position. Although the brake pad 300 can be replaced in a short period of time, there is a raw edge 34 formed on the brake surface 33 of the brake pad 300. The raw edge 34 is formed because the brake pad 300 is manufactured by two lateral molds, the raw edge 34 has to be removed by a further process which takes time.

The present invention intends to provide a device for manufacturing brake pads wherein the raw edge formed between molds is located on the lateral side of the brake pad so that the shortcoming of the conventional brake pads is overcome.

SUMMARY OF THE INVENTION

In accordance with one aspect of the present invention, there is provided a device for manufacturing brake pads, comprising a base board having a first flange, a second flange and a third flange respectively extending from the upper side thereof, a first recess defined between the first flange and the second flange, a second recess defined between the second flange and the third flange. At least one rod extends from the bottom defining the first recess. The first flange has a plurality of first notches defined in the side facing to the second flange and the second flange has a plurality of second notches defined in two sides thereof.

A first mold is movably received in the first recess and has a hole defined in one of two ends thereof so as to receive the rod. A plurality of slots are defined in the upper side of the first mold and of the slots are respectively located in alignment with the first notches and the second notches.

A second mold is movably received in the second recess and has a plurality of concavities defined in the side facing to the second flange. The concavities are located in alignment with the second notches in the second flange. A cover mold has a plurality of elongated recesses defined in the bottom thereof and is removably mounted to the first mold and the second mold. The elongated recesses are respectively located to communicate with each pair of the slot and the first notch, and each pair of the slot and the second notch.

The main object of the present invention is to provide the device manufacturing the brake pads wherein the raw edge is located one the lateral sides of the brake pad.

Further objects, advantages, and features of the present invention will become apparent from the following detailed description with appropriate reference to the accompanying drawings.

DETAILED DESCRIPTION OF THE PREFERRED EMBODIMENTS

Figure 1:
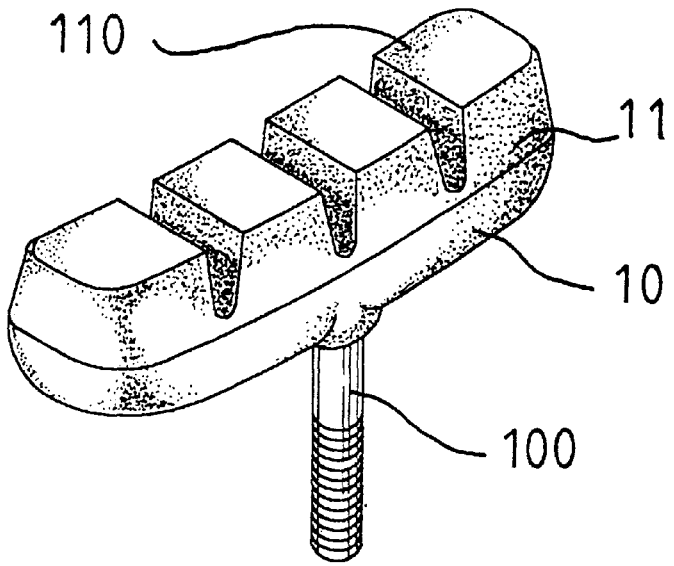
FIG. 1 is a perspective view of the first conventional brake pad.
Figure 2:
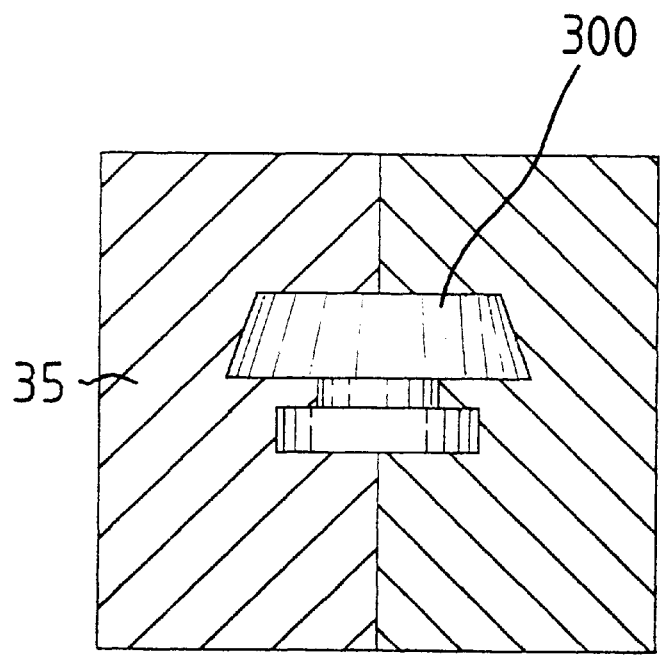
FIG. 2 is an illustrative view to illustrate how the second brake pad is manufactured by the two molds.
Figure 3:
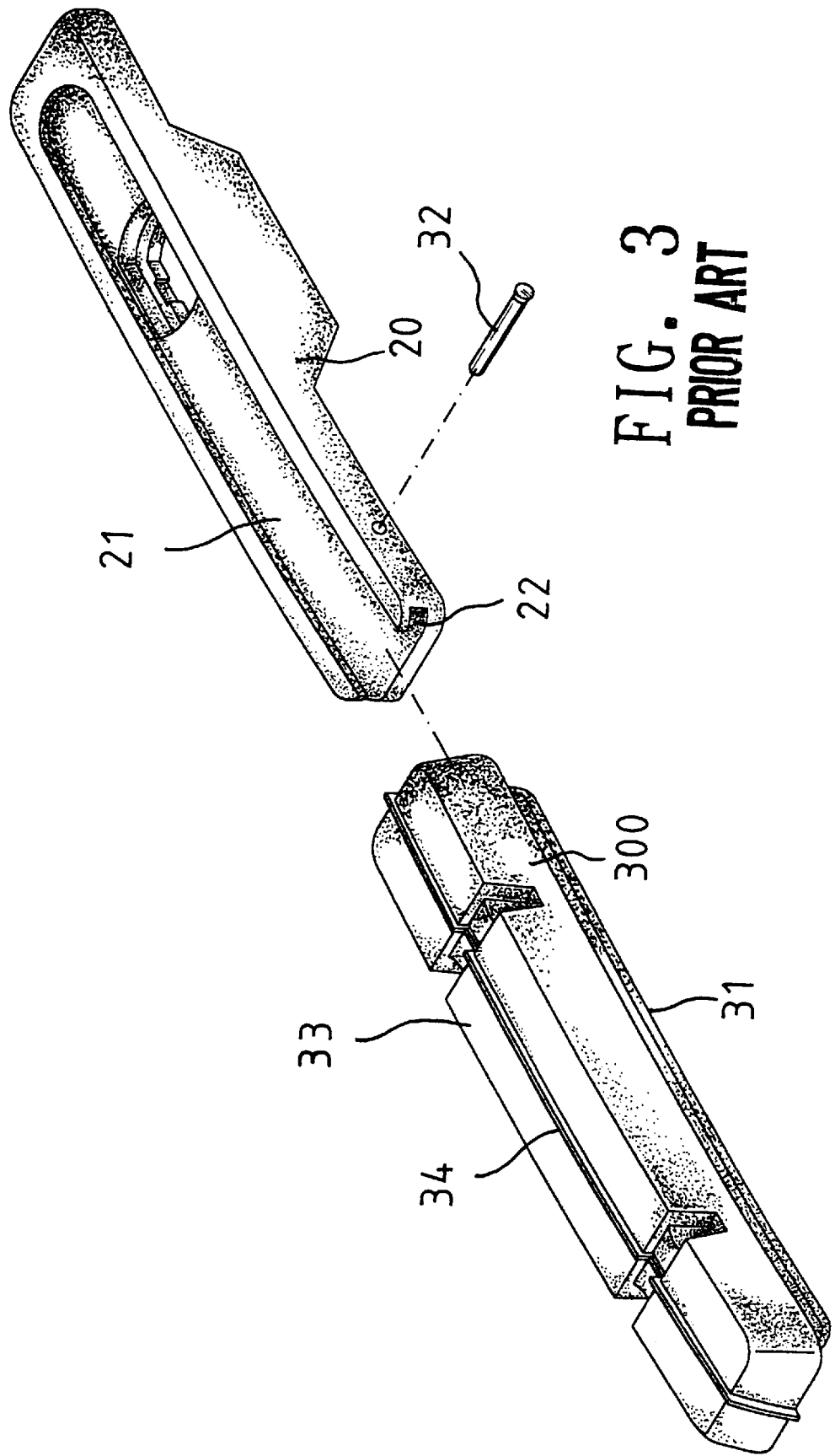
FIG. 3 is an exploded view of the second conventional brake pad and the metallic frame.
Figure 4:
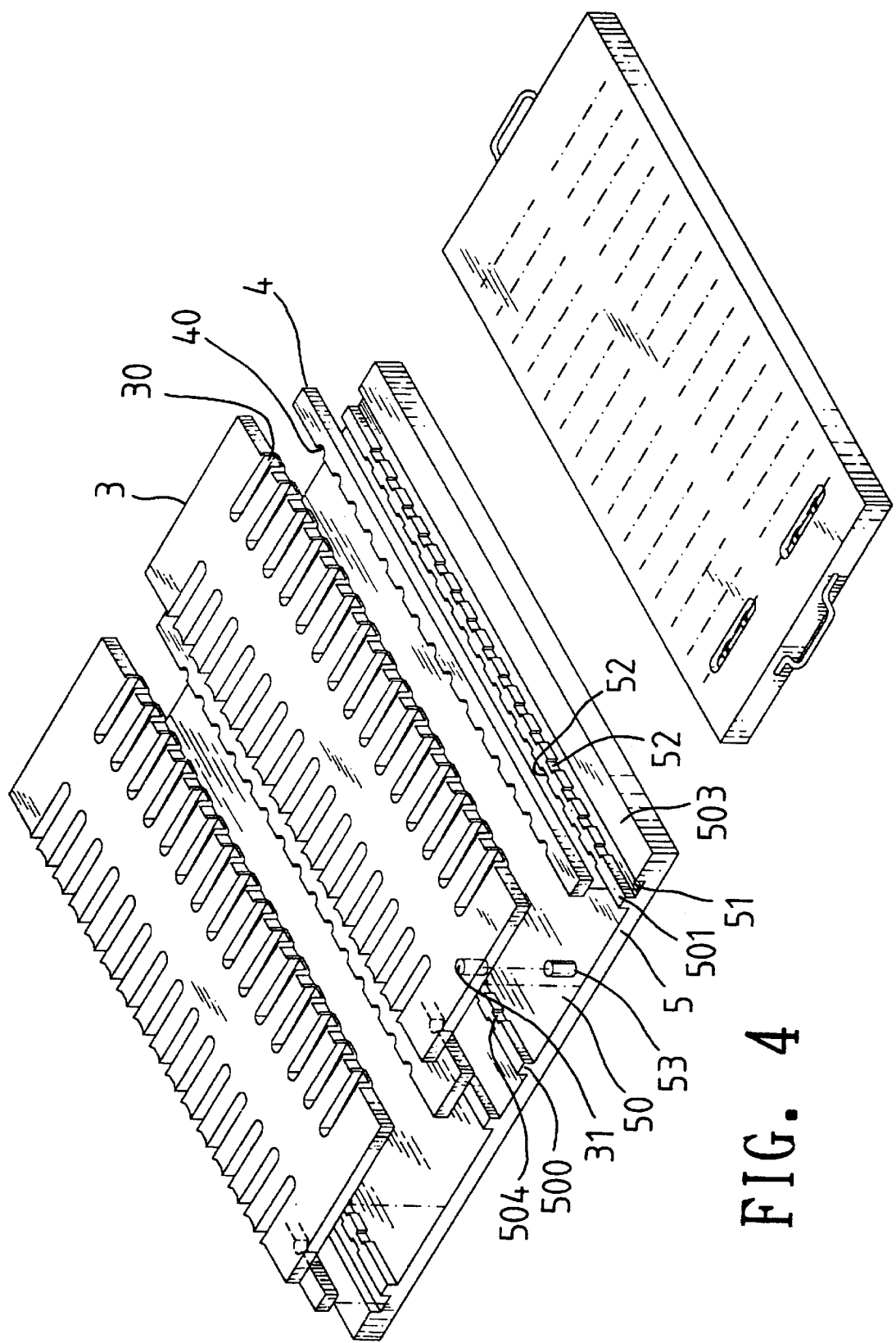
FIG. 4 is an exploded view of the device of the present invention for manufacturing the brake pad.
Figure 5:
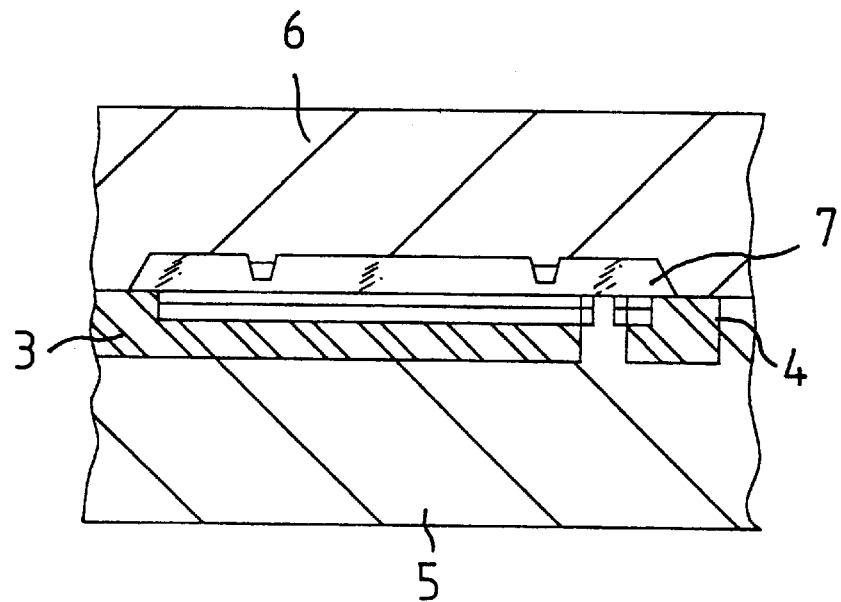
FIG. 5 is a side elevational view, partly in section, to show the brake pad is formed in the device in accordance with the present invention.
Figure 7:
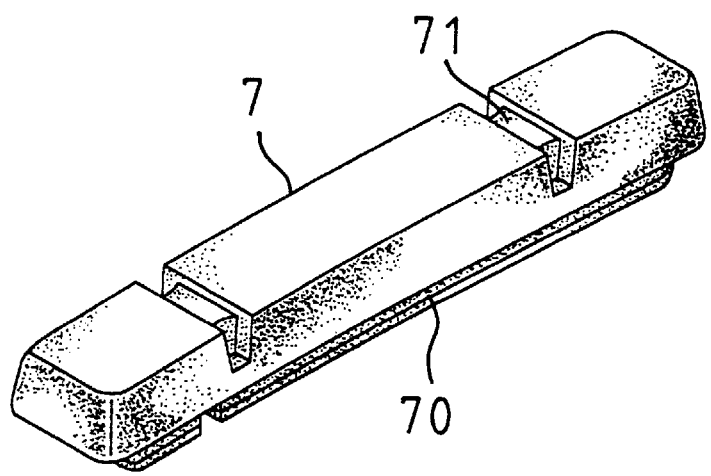
FIG. 7 is a perspective view to show the brake pad manufactured by the device of the present invention.

Referring to FIGS. 4 to 7, the device for manufacturing brake pads of the present invention comprises a base board 5 having a first flange 500, a second flange 501 and a third flange 503 respectively extending from the upper side thereof so as to define a first recess 50 between the first flange 500 and the second flange 501, and a second recess 51 between the second flange 501 and the third flange 503. At least one rod 53 extends from the bottom defining the first recess 50. The first flange 500 has a plurality of first notches 504 defined in the side facing to the second flange 501 and the second flange 501 has a plurality of second notches 52 defined in two sides thereof.

A first mold 3 is movably received in the first recess 50 and has a hole 31 defined in one of two ends thereof so as to receive the rod 53 to position the first mold 3. A plurality of slots 30 are defined in the upper side of the first mold 3 and the slots 30 are respectively located in alignment with the first notches 504 in the first flange 500 and the second notches 52 in the second flange 501.

A second mold 4 is movably received in the second recess 51 and has a plurality of concavities 40 defined in the side facing to the second flange 501. The concavities 40 are located in alignment with the second notches 52 in the second flange 501. A cover mold 6 has a plurality of elongated recesses 60 defined in the bottom thereof and is removably mounted to the first mold 3 and the second mold 4. The elongated recesses 60 are respectively located to communicate with each pair of the slot 30 and the first notch 504 and each pair of the slot 30 and the second notch 52. Two ribs 61 extend form the bottom defining each of the elongated recesses 60.

Figure 6:
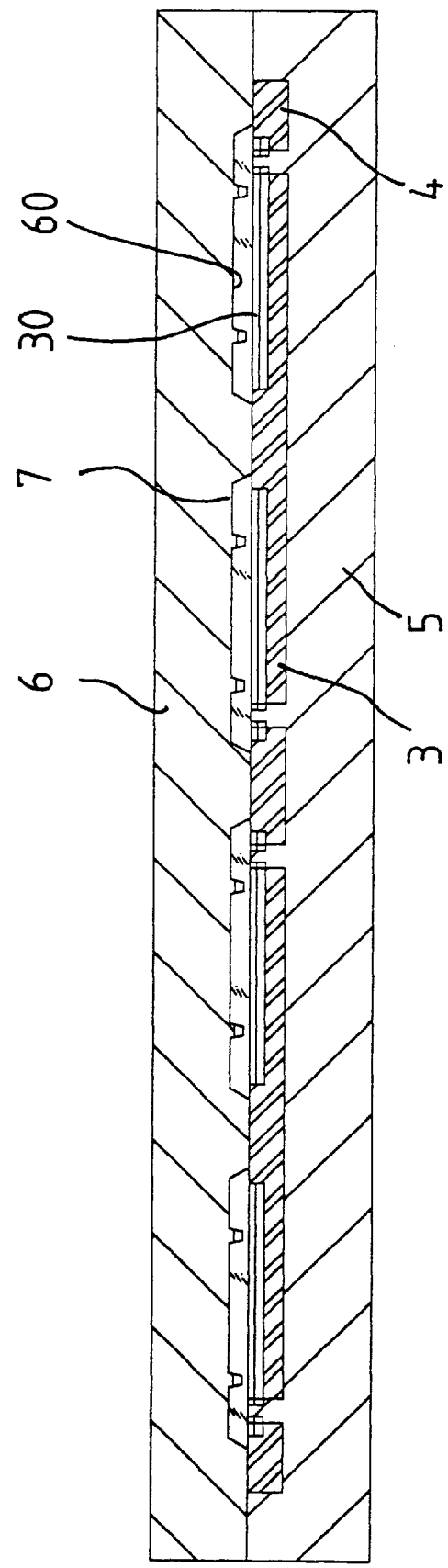
FIG. 6 is a side elevational view, partly in section, of the device of the present invention.

When the cover mold 6 is mounted to the first mold 3 and the second mold 4, rubber material suitable made to be the brake pads is injected into the spaces defined between the elongated recesses 60, the slots 30, the concavities 40, the first notches 504 and the second notches 52. After the rubber material is solidified, the cover mold 6 is removed and two rows of the brake pads 7 are formed in the upper side of the base board 5. The brake pad 7 has three partitions separated by two grooves 71 which are formed by the two ribs 61. Because the departing planes between the cover mold 6, the first mold 3 and the second mold 4 is not located on the brake surface of the brake pad 7 so that after the brake pad 7 is made, the raw edge will be located on one lateral side of the brake pad 7. As shown in FIG. 6, the numbers of the slots 30 and the elongated recesses 60 can be increased or decreased as needed.

Although the invention has been explained in relation to its preferred embodiment, it is to be understood that many other possible modifications and variations can be made without departing from the spirit and scope of the invention as hereinafter claimed.

The invention is not limited to the above embodiment but various modification thereof may be made. It will be understood by those skilled in the art that various changes in form and detail may made without departing from the scope and spirit of the present invention.

What is claimed is:

1. A device for manufacturing brake pads, comprising:

a base board having a first flange, a second flange and a third flange respectively extending from an upper side thereof, a first recess defined between said first flange and said second flange, a second recess defined between said second flange and said third flange, said first recess being defined by a periphery from which at least one rod extends, said first flange having a plurality of first notches defined in a thereof facing said second flange, said second flange having a plurality of second notches defined in two sides thereof;

a first mold movably received in said first recess and having a hole defined in one of two ends thereof so as to receive said rod, a plurality of slots defined in a side of said first mold and said slots respectively located in alignment with said first notches in said first flange and said second notches in said second flange;

a second mold movably received in said second recess and having a plurality of concavities defined in a side facing said second flange, said concavities located in alignment with said second notches in said second flange, and a cover mold having a plurality of elongated recesses defined therein and said cover mold removably mounted to said first mold and said second mold, said elongated recesses respectively being located to communicate with each pair of said slot and said first notch and each pair of said slot and said second notch.

2. The device as claimed in claim 1. wherein each of said elongated recesses is defined by a periphery from which two ribs extend.

* * * * *